US012615333B2

(12) United States Patent
Neitzel et al.

(10) Patent No.: US 12,615,333 B2
(45) Date of Patent: Apr. 28, 2026

(54) TECHNIQUE FOR ACCURATELY CHARACTERIZING DROPPED CALLS

(71) Applicant: Charter Communications Operating, LLC, St. Louis, MO (US)

(72) Inventors: Erik Neitzel, Littleton, CO (US); Mohit Anand, Englewood, CO (US); Naman Sheth, Lewisville, TX (US); Lincy John, Elgin, IL (US)

(73) Assignee: Charter Communications Operating, LLC, St. Louis, MO (US)

( * ) Notice: Subject to any disclaimer, the term of this patent is extended or adjusted under 35 U.S.C. 154(b) by 222 days.

(21) Appl. No.: 18/737,325

(22) Filed: Jun. 7, 2024

(65) Prior Publication Data

US 2025/0379936 A1    Dec. 11, 2025

(51) Int. Cl.
H04W 24/00    (2009.01)
H04M 3/22    (2006.01)
H04W 88/06    (2009.01)

(52) U.S. Cl.
CPC ....... H04M 3/2227 (2013.01); H04M 3/2218 (2013.01); H04W 24/00 (2013.01); H04W 88/06 (2013.01)

(58) Field of Classification Search
None
See application file for complete search history.

(56) References Cited

U.S. PATENT DOCUMENTS

| | | | | |
|---|---|---|---|---|
| 9,432,865 | B1 * | 8/2016 | Jadunandan | H04L 43/08 |
| 10,609,211 | B2 * | 3/2020 | Donnenwirth | H04M 15/41 |
| 2004/0077331 | A1 * | 4/2004 | King | H04W 24/00 |
| | | | | 455/403 |
| 2016/0277267 | A1 * | 9/2016 | Seetharaman | H04M 15/70 |
| 2021/0368040 | A1 * | 11/2021 | Mohammed | H04M 3/26 |

OTHER PUBLICATIONS

"Support for Multi-SIM devices forLTE/NR.", www.3gpp.org, 2021 [retrieved on Sep. 5, 2024] Retrieved from the Internet: <URL: https://www.3gpp.org/technologies/support-for-multi-sim-devices-for-lte-nr> (4 pages).
3GPP, "Support for Multi-SIM devices for LTE/NR." 3GPP TSG RAN Meeting #93e, Document Code RP-212610, Identifier: 860063. Electronic Meeting, Sep. 13-17, 2021 (2021): (5 pages).

* cited by examiner

*Primary Examiner* — Quoc D Tran
(74) *Attorney, Agent, or Firm* — Mendelsohn Dunleavy, P.C.; Steve Mendelsohn

(57) ABSTRACT

A cellular network compares the timestamps of dropped calls with the timestamps of DSDS-device transitions from the cellular network to another cellular network to identify apparent dropped calls as being transitions and not dropped calls. In this way, the cellular network avoids mis-characterizing DSDS-device transitions as being dropped calls, thereby resulting in the generation of a more-accurate drop-call rate for the cellular network.

8 Claims, 3 Drawing Sheets

DSDS CONNECTS TO N/W 1 — 202

DSDS TRANSITIONS FROM N/W 1 TO N/W 2 — 204

DSDS RECORDS TRANSITION AND N/W 1 RECORDS APPARENT DROPPED CALL — 206

ANALYTICS MODULE RECEIVES RECORDS FROM DSDS AND N/W 1 — 208

ANALYTICS MODULE COMPARES TIMESTAMPS — 210

ANALYTICS MODULE RE-CLASSIFIES DROPPED CALL — 212

ANALYTICS MODULE GENERATES ACCURATE DROP-CALL RATE — 214

200

202 — DSDS CONNECTS TO N/W 1

204 — DSDS TRANSITIONS FROM N/W 1 TO N/W 2

206 — DSDS RECORDS TRANSITION AND N/W 1 RECORDS APPARENT DROPPED CALL

208 — ANALYTICS MODULE RECEIVES RECORDS FROM DSDS AND N/W 1

210 — ANALYTICS MODULE COMPARES TIMESTAMPS

212 — ANALYTICS MODULE RE-CLASSIFIES DROPPED CALL

214 — ANALYTICS MODULE GENERATES ACCURATE DROP-CALL RATE

200

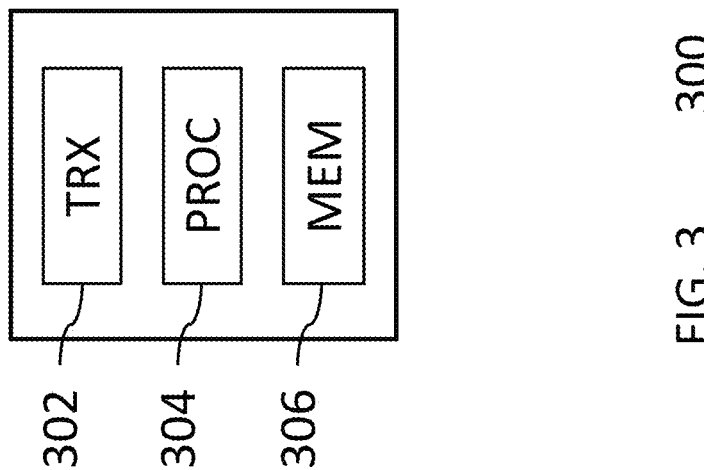
302
304
306
FIG. 3          300

TECHNIQUE FOR ACCURATELY CHARACTERIZING DROPPED CALLS

BACKGROUND

Field of the Disclosure

The present disclosure relates to cellular communications and, more specifically but not exclusively, to cellular communications using dual-SIM, dual-subscription (DSDS) devices.

Description of the Related Art

This section introduces aspects that may help facilitate a better understanding of the disclosure. Accordingly, the statements of this section are to be read in this light and are not to be understood as admissions about what is prior art or what is not prior art.

It is known for cellular service operators to maintain statistics characterizing their operations in order to identify and address problems with their cellular service. One such statistic is the so-called drop-call rate at which connections between the operator's cellular network and the user equipment (UE) of the operator's subscribers are, for whatever reason, prematurely and undesirably terminated.

A dual-SIM, dual-subscription (DSDS) device is a type of UE having two subscriber identification modules (SIMs) that enable the device to communicate with either of two different cellular networks. It is known for a DSDS device to transition from communicating with the cellular network of a first cellular service operator using one of its SIM modules to communicating with the cellular network of a second cellular service operator using its other SIM module. There are situations in which a DSDS device decides to make such a transition on its own and without informing the first cellular network about the transition. In that case, the transition appears to the first cellular network to be indistinguishable from a dropped call. As a result, the first cellular network will interpret that purposeful transition as a dropped call, which improperly increases the network's drop-call rate.

SUMMARY

Problems in the prior art are addressed in accordance with the principles of the present disclosure by technology that identifies and properly characterizes DSDS device-initiated transitions between cellular networks and avoids counting those transitions as dropped calls, thereby enabling a more-accurate characterization of the cellular network's drop-call rate. In some embodiments, a cellular network compares the timestamps of dropped calls with the timestamps of DSDS-device transitions from the cellular network to another cellular network to identify apparent dropped calls as being transitions and not dropped calls. In this way, the cellular network avoids mis-characterizing DSDS-device transitions as being dropped calls, thereby resulting in the generation of a more-accurate drop-call rate for the cellular network.

In at least one embodiment of the present disclosure, a cellular network detects dropped calls; stores records of the dropped calls, each dropped-call record comprising a dropped-call timestamp; receives, from at least one dual-SIM, dual-subscription (DSDS) device, at least one record of a transition from the DSDS device communicating with the cellular network to the DSDS device communicating with another cellular network, the transition record comprising a transition timestamp; compares the transition timestamp in the transition record with the dropped-call timestamps in the dropped-call records to identify one of the dropped-call timestamps as being within a specified duration of the transition timestamp; re-classifies the dropped call associated with the identified dropped-call timestamp as corresponding to the transition; and generates a drop-call rate for the cellular network without including the dropped call associated with the identified dropped-call timestamp.

BRIEF DESCRIPTION OF THE DRAWINGS

Embodiments of the disclosure will become more fully apparent from the following detailed description, the appended claims, and the accompanying drawings in which like reference numerals identify similar or identical elements.

FIG. 3 is a simplified hardware block diagram of an example node that can be used to implement any of the elements of FIG. 1.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
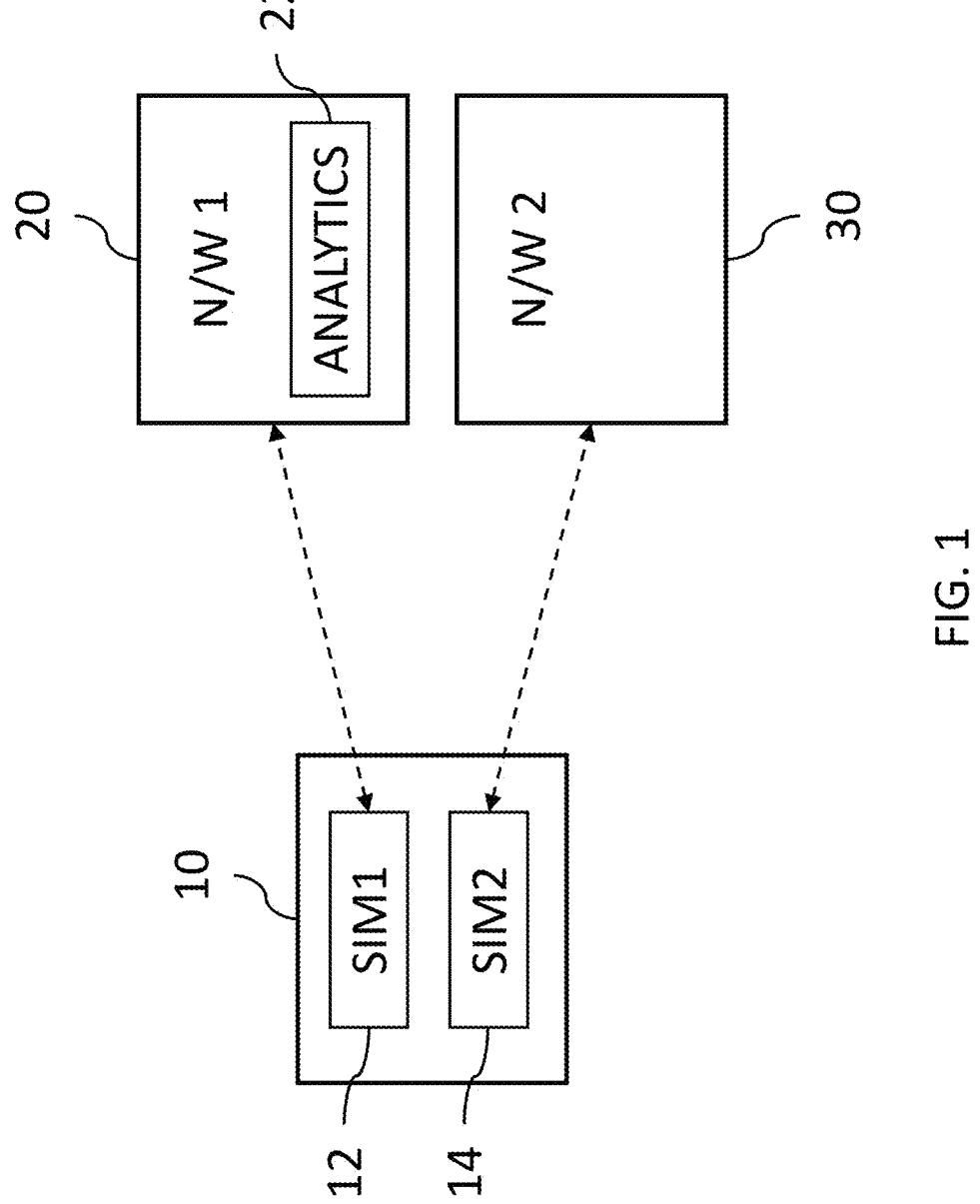
FIG. 1 is a block diagram of a DSDS device having two SIM modules that enable the DSDS device to communicate with either of two different cellular networks, respectively.

FIG. 1 is a block diagram of a DSDS device 10 having two SIM modules 12 and 14 that enable the DSDS device 10 to communicate with either of two different cellular networks 20 and 30, respectively. As shown in FIG. 1, the infrastructure of the first cellular network 20 includes an analytics module 22 that generates the network's key performance indicators (KPIs), including its drop-call rate.

Figure 2:
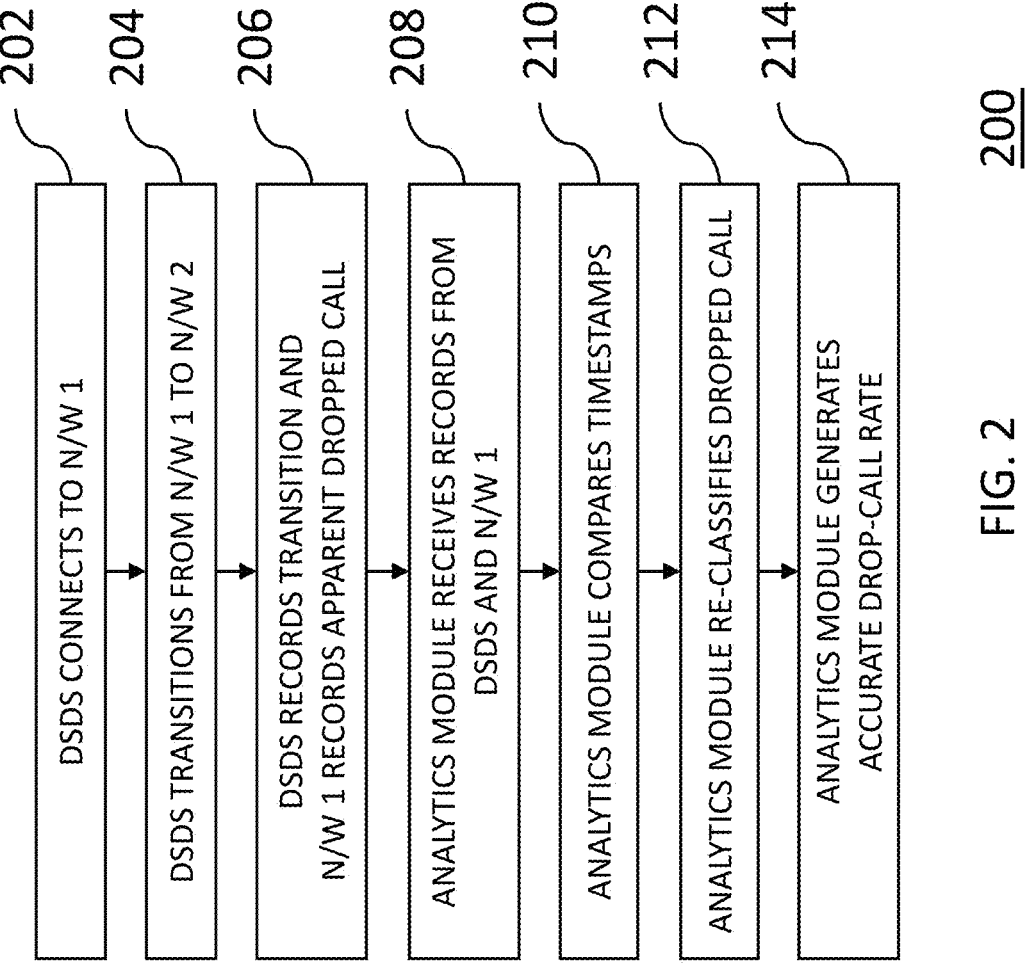
FIG. 2 is a flow diagram of the processing performed in one possible scenario, in which the DSDS device of FIG. 1 decides on its own to transition from communicating with the first cellular network to communicating with the second cellular network.

FIG. 2 is a flow diagram of the processing 200 performed in one possible scenario, in which DSDS device 10 of FIG. 1 decides on its own (e.g., without being directed to do so by either cellular network) to transition from communicating with the first cellular network 20 to communicating with the second cellular network 30.

In step 202 of FIG. 2, the DSDS device 10 establishes a cellular connection with the first cellular network 20. In step 204, the DSDS device 10 transitions from communicating with the first cellular network 20 to communicating with the second cellular network 30.

In step 206, the DSDS device 10 stores, in its local memory, a record of that transition including the transition timestamp, and the first cellular network 20 stores, in its own local memory, a record of the apparent dropped call including the apparent dropped-call timestamp.

In step 208, the analytics module 22 receives (i) from the DSDS device 10, the stored records of transitions to the second cellular network 30 and (ii) from the first cellular network 20, the stored records of apparent dropped calls with its subscribers' UEs, including DSDS device 10. Since the analytics module 22 is part of the infrastructure of the first cellular network 20, depending on the implementation, the analytics module 22 may receive the network's records of apparent dropped calls as soon as they occur or at some later point in time. In some implementations, the analytics module 22 receives the DSDS device's transition records at some later point in time, such as when the DSDS device 10 connects to a WiFi network operated by the cellular network operator or when the DSDS device 10 next connects to the first cellular network 20.

In step 210, the analytics module 22 compares the timestamps in the transition records from the UEs that are also DSDS devices with the timestamps in the dropped-call records from the first cellular network 20 to determine if any pair of timestamps are within a specified duration (e.g., 60 seconds) of each other for the same DSDS device. If so, then, in step 212, the analytics module 22 re-classifies those corresponding DSDS device transitions as not being dropped calls. As such, in step 214, the analytics modules 22 does not include those instances when calculating the drop-call rate for the first cellular network 20, thereby generating an accurate drop-call rate for the first cellular network 20 using the remaining drop-call records.

FIG. 3 is a simplified hardware block diagram of an example node 300 that can be used to implement any of the elements of FIG. 1. As shown in FIG. 3, the node 300 includes (i) communication hardware (e.g., wireless, wireline, and/or optical transceivers (TRX)) 302 that supports communications with other nodes, (ii) one or more processors (e.g., CPU and/or GPU microprocessors) 304 that control the operations of the node 300 and/or process data within the node 300, and (iii) one or more memories (e.g., RAM, ROM) 306 that store code executed by the processors 304 and/or data generated and/or received by the node 300.

In certain embodiments, the present disclosure is a method for a cellular network generating a drop-call rate. The method comprises the cellular network detecting dropped calls; storing records of the dropped calls, each dropped-call record comprising a dropped-call timestamp; receiving, from at least one dual-SIM, dual-subscription (DSDS) device, at least one record of a transition from the DSDS device communicating with the cellular network to the DSDS device communicating with another cellular network, the transition record comprising a transition timestamp; comparing the transition timestamp in the transition record with the dropped-call timestamps in the dropped-call records to identify one of the dropped-call timestamps as being within a specified duration of the transition timestamp; re-classifying the dropped call associated with the identified dropped-call timestamp as corresponding to the transition; and generating a drop-call rate for the cellular network without including the dropped call associated with the identified dropped-call timestamp.

In at least some of the above embodiments, the cellular network receives the transition record from the DSDS device via a subsequent connection between the DSDS device and the cellular network.

In at least some of the above embodiments, the subsequent connection is a WiFi connection between the DSDS device and a WiFi network associated with the cellular network.

In at least some of the above embodiments, the subsequent connection is a cellular connection between the DSDS device and the cellular network.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure.

As used herein in reference to an element and a standard, the terms "compatible" and "conform" mean that the element communicates with other elements in a manner wholly or partially specified by the standard and would be recognized by other elements as sufficiently capable of communicating with the other elements in the manner specified by the standard. A compatible or conforming element does not need to operate internally in a manner specified by the standard.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. Upon being provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As will be appreciated by one of ordinary skill in the art, the present disclosure may be embodied as an apparatus (including, for example, a system, a network, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system" or "network".

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, upon the program code being loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, upon the program code being loaded into and executed by a machine, such as a computer, the machine becomes an apparatus for practicing the disclosure. Upon being implemented on a general-purpose processor, the program code segments combine with the processor to provide a unique device that operates analogously to specific logic circuits. The term "non-transitory," as used herein, is a limitation of the medium itself (i.e., tangible, not a signal) as opposed to a limitation on data storage persistency (e.g., RAM vs. ROM).

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1—only A; 2—only B; 3—both A and B.

All documents mentioned herein are hereby incorporated by reference in their entirety or alternatively to provide the disclosure for which they were specifically relied upon.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:
1. A method for a cellular network generating a drop-call rate, the method comprising the cellular network:
detecting dropped calls;

7 storing records of the dropped calls, each dropped-call record comprising a dropped-call timestamp;

receiving, from at least one dual-SIM, dual-subscription (DSDS) device, at least one record of a transition from the DSDS device communicating with the cellular network to the DSDS device communicating with another cellular network, the transition record comprising a transition timestamp;

comparing the transition timestamp in the transition record with the dropped-call timestamps in the dropped-call records to identify one of the dropped-call timestamps as being within a specified duration of the transition timestamp;

re-classifying the dropped call associated with the identified dropped-call timestamp as corresponding to the transition; and generating a drop-call rate for the cellular network without including the dropped call associated with the identified dropped-call timestamp.

2. The method of claim 1, wherein the cellular network receives the transition record from the DSDS device via a subsequent connection between the DSDS device and the cellular network.

3. The method of claim 2, wherein the subsequent connection is a WiFi connection between the DSDS device and a WiFi network associated with the cellular network.

4. The method of claim 2, wherein the subsequent connection is a cellular connection between the DSDS device and the cellular network.

5. A cellular network for generating a drop-call rate, the cellular network comprising:

a memory; and at least one processor, coupled to the memory and operative to cause the cellular network to:

8 detect dropped calls;

store records of the dropped calls, each dropped-call record comprising a dropped-call timestamp;

receive, from at least one DSDS device, at least one record of a transition from the DSDS device communicating with the cellular network to the DSDS device communicating with another cellular network, the transition record comprising a transition timestamp;

compare the transition timestamp in the transition record with the dropped-call timestamps in the dropped-call records to identify one of the dropped-call timestamps as being within a specified duration of the transition timestamp;

re-classify the dropped call associated with the identified dropped-call timestamp as corresponding to the transition; and generate a drop-call rate for the cellular network without including the dropped call associated with the identified dropped-call timestamp.

6. The cellular network of claim 5, wherein the cellular network is adapted to receive the transition record from the DSDS device via a subsequent connection between the DSDS device and the cellular network.

7. The cellular network of claim 6, wherein the subsequent connection is a WiFi connection between the DSDS device and a WiFi network associated with the cellular network.

8. The cellular network of claim 6, wherein the subsequent connection is a cellular connection between the DSDS device and the cellular network.

* * * * *